United States Patent [19]

Pergandis

[11] Patent Number: 4,697,133
[45] Date of Patent: Sep. 29, 1987

[54] RECHARGEABLE BATTERY POWERED TOY

[76] Inventor: Grigorios Pergandis, 45, Agoniston Stratopedou Haidariou Street, Haidari, Attica, Greece

[21] Appl. No.: 865,047

[22] Filed: May 20, 1986

[30] Foreign Application Priority Data

Aug. 23, 1985 [GR] Greece .............................. 85.2151/A

[51] Int. Cl.⁴ ...................... H02J 7/00; A63H 29/22; F21V 23/04
[52] U.S. Cl. ......................................... 320/2; 200/60; 446/462; 446/484
[58] Field of Search ............... 446/454, 457, 439, 462, 446/484; 200/60; 320/2–5

[56] References Cited

U.S. PATENT DOCUMENTS

| | | | |
|---|---|---|---|
| 3,238,394 | 3/1966 | Cohn | 320/25 X |
| 3,564,761 | 2/1971 | Bear et al. | 200/60 R X |
| 3,793,769 | 2/1974 | Tong | 200/60 R X |
| 4,301,946 | 11/1981 | Goldin et al. | 200/60 R X |

*Primary Examiner*—Robert J. Hickey
*Attorney, Agent, or Firm*—Dowell & Dowell

[57] ABSTRACT

An article having an electric motor which is powered by a battery which is capable of being recharged and which is connected and disconnected to the electric motor by movement of the battery between an operating position and a recharging position. The battery is housed within a casing which is movably supported within the article within which the electric motor is mounted and which article may take the form of a vehicular toy.

5 Claims, 10 Drawing Figures

4,697,133

RECHARGEABLE BATTERY POWERED TOY

BACKGROUND OF THE INVENTION

1. Field of the Invention

This invention is generally related to a battery powered toy device and particularly to such a device which incorporates a rechargeable battery which is movably supported within the device between a first charging position and a second motor activating position. The present invention does away with the electrically wired connections and switches which were up to now required for the connection of a source of power to a motor and does so without the need for a plug for connecting the battery to a recharging source. There is also no need for a separate switch for supplying current from the battery to an electric motor since the battery itself is movable so as to create a current flow to the electric motor.

2. History of the Prior Art

The existing technology has not conceived nor appreciated the need for designing nor operating a toy having an electrical power source which is energized by a battery which is capable of being recharged and which battery also acts as the on/off switch for supplying current to an electric motor. In the field of children's games where the limited electric drive or power is produced by a battery which powers an electric motor and which battery is capable of being recharged, use has been made of complicated uneconomical structures.

In many prior art battery powered toys, the normal operation consists in the total removal of a battery which must be recharged in order to connect the same to a source of electrical supply and thereby be recharged for powering an electric motor. Such prior art structures and manners of recharging batteries is cumbersome and time consuming. Another method which is widely used consist in joining the battery and the electric motor into a unified casing which may be connected by cables and energized by connecting plugs with the recharging process of the battery performed without having to disassemble the battery from the toy. However, in these instances, suitable switches are necessary to selectively connect and disconnect the various electrical lead wires and plugs.

SUMMARY OF THE INVENTION

The present invention does away with the above mentioned disadvantages of the prior art technology and provides for a mechanism for the charging of a battery capable of being recharged for the supplying of current to an electric motor without a separate switch, cables or electrical connecting plugs.

An object of the present invention is to simplify the operation and process of energizing batteries used in toys and to provide the toys with an efficient degree of power at low cost.

These and other objects, features and advantages of the present invention shall become more readily apparent from the detailed description that follows.

DESCRIPTION OF THE PREFERRED EMBODIMENT

Figure 1:
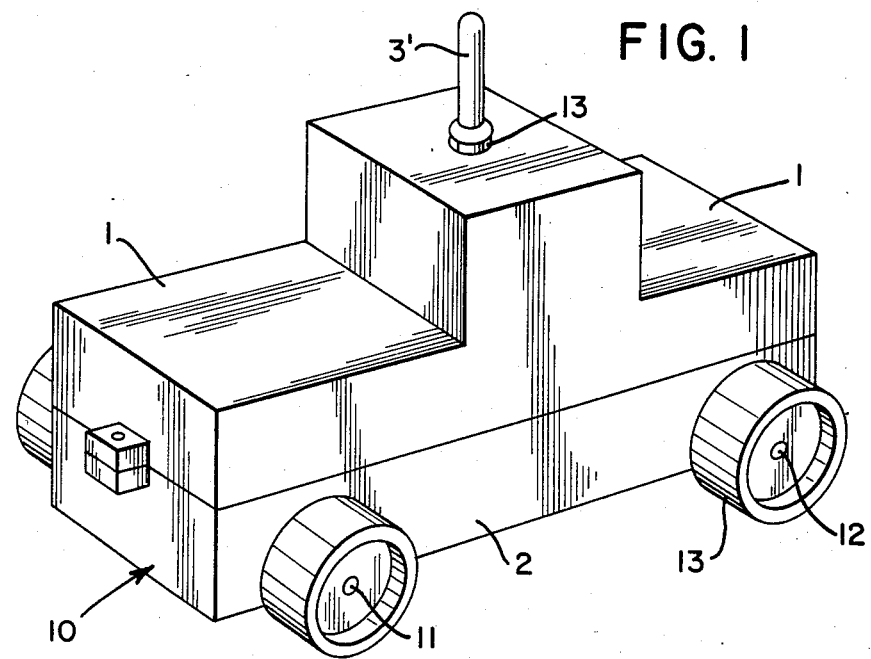
FIG. 1 is a perspective view of a toy vehicle incorporating the movable rechargeable battery power source of the present invention.
Figure 2:
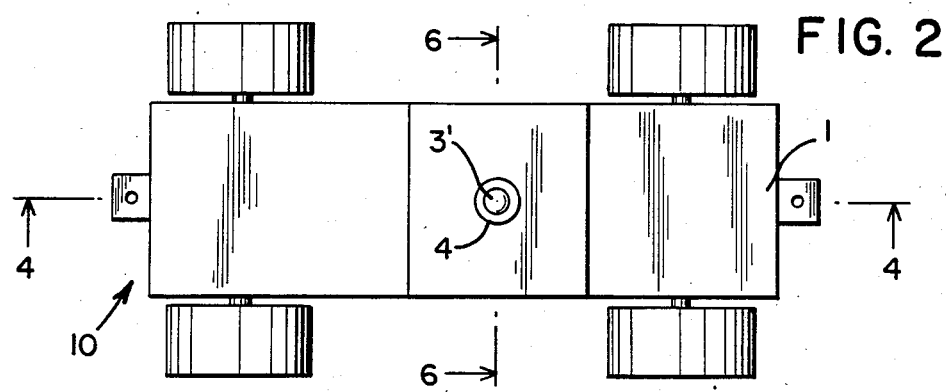
FIG. 2 is a top plan view of the toy apparatus of FIG. 1.
Figure 3:
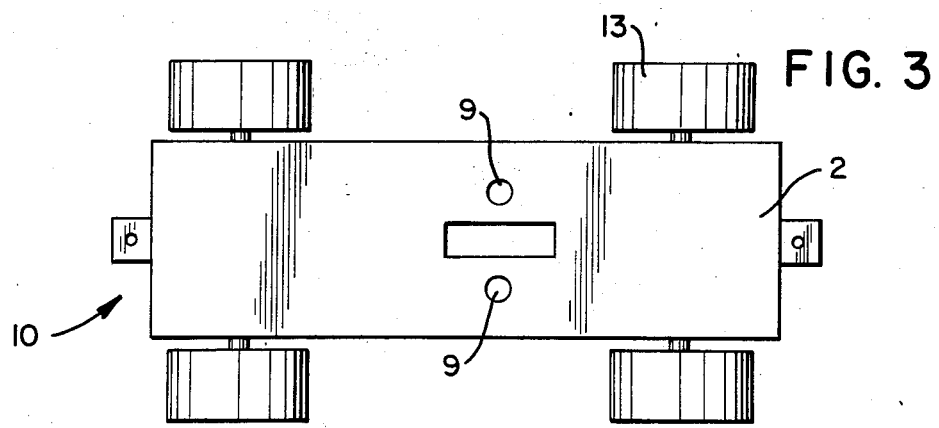
FIG. 3 is a bottom plan view of the toy apparatus of FIG. 1.

Referring now to the accompanying drawings, the present invention may be fitted or mounted, for example, on the chassis 10 of a toy wheeled vehicle for children. The vehicle includes a front axle 11 and a rear axle 12 on which wheels 13 are installed. The rear axle 12 is driven by an electric motor 5.

Figure 8:
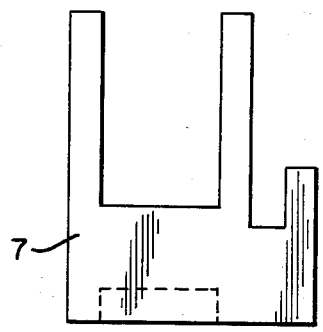
FIG. 8 is a front elevational view of one of the electrical contacts between the battery and the motor of the present invention.
Figure 9:
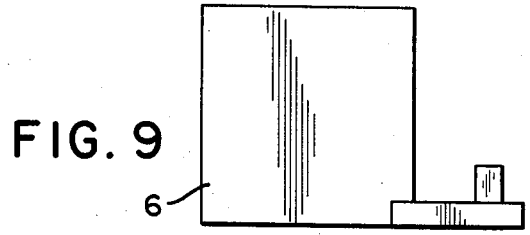
FIG. 9 is a front elevational view of a second electrical contact disposed between the battery and the motor of the present invention.
Figure 10:
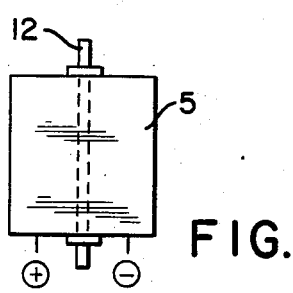
FIG. 10 is a top plan view of the motor of the present invention.

The invention is basically composed of the electric motor 5 to which are fitted electrical plate contacts 6 and 7. The contacts are shown specifically in FIGS. 8 and 9. A rechargeable battery 8 is removably carried by a suitable housing or casing 3 from which an elongated arm 3' extends. The elongated arm is provided with a pair of projections 4 which extend outwardly therefrom.

The above described main components of the invention, i.e. the electric motor 5, the pair of contact plates 6 and 7 and the rechargeable battery 8 mounted within the casing 3 are contained in a suitable housing which may have the appearance of the vehicle 10 and which is made of plastic or other suitable material. The housing or vehicle may consist of an upper shell 1 and a lower shell 2. An opening 13 is provided in the upper shell 1 through which the elongated arm 3' of the casing 3 is selectively movable. A second opening or hole 9 is provided in the lower shell 2 to permit the introduction of the loader or battery charger 14 which is utilized to supply recharge current to the battery.

In the assembly of the invention, the contacts 6 and 7 are welded at their ends to the corresponding poles (−, + respectively) of the electric motor 5 while the intermediate parts or sections thereof are in contact with the corresponding poles of the battery 8.

Figure 4:
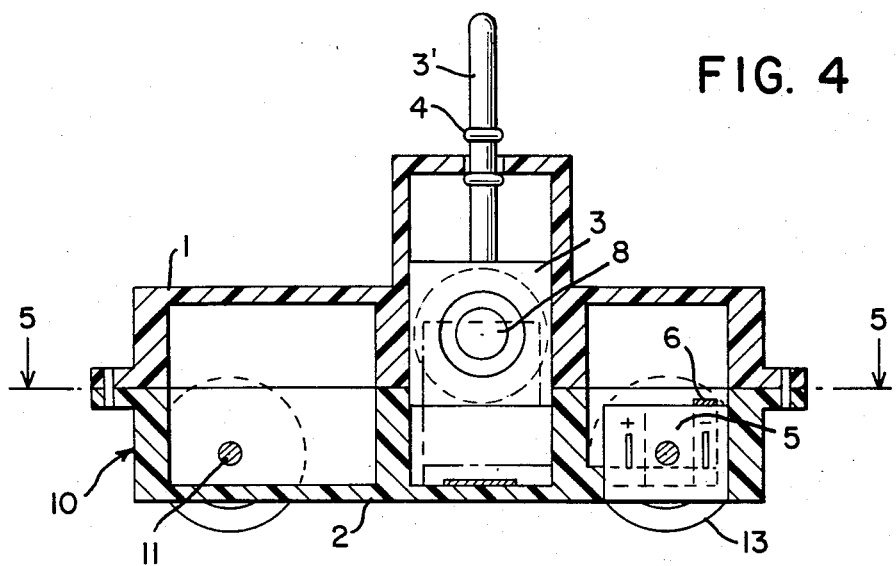
FIG. 4 is a cross sectional view taken along lines 4—4 of FIG. 2 and showing the rechargeable battery raised in a charging position wherein no current is supplied to the motor mounted within the apparatus.
Figure 5:
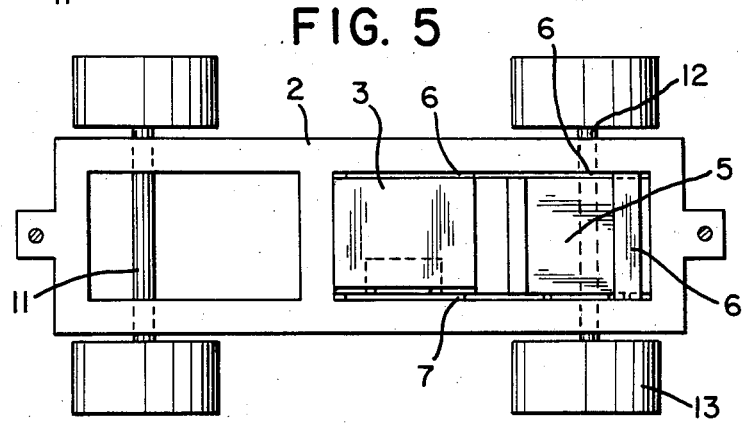
FIG. 5 is a cross sectional view taken along lines 5—5 of FIG. 4.
Figure 6:
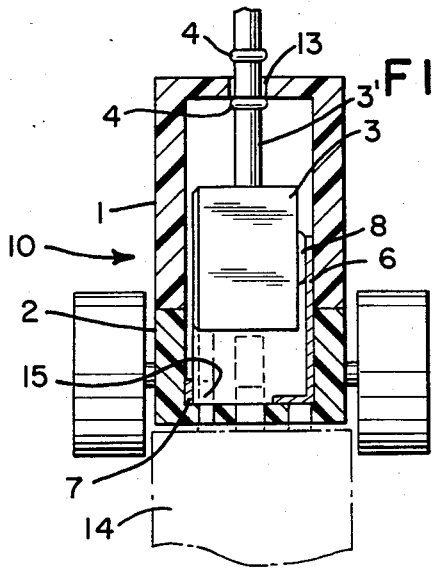
FIG. 6 is a cross sectional view taken along lines 6—6 of FIG. 3 showing the battery in a charging position with a charging source shown in dotted line.

The present invention is illustrated at the loading or recharging position in FIGS. 4 and 6. The loading of the battery is performed prior to providing any current to the electric motor 5. At the loading position, the casing 3 retaining the battery 8 is displaced by pushing the recharger projections 15 which are introduced through the holes 9 in the lower shell of the toy housing to a position where the upper projection 4 carried by the arm 3' is above the opening 13 in the casing. At this position, the battery is being recharged and is supplied with current through the contacts 6 and the projection 15 of the recharger which projection has current flowing therethrough. In this way, the recharging is performed for any desired period of time (as an example, approximately 20 seconds). In connection herewith, it should be noted that during the charging process that only one end or pole of the battery is in contact with electrical contact plate 6 while the other contact plate 7 remains disconnected and of engagement with the battery. When the recharging is completed, the recharger is removed and the toy is ready to start operating.

Figure 7:
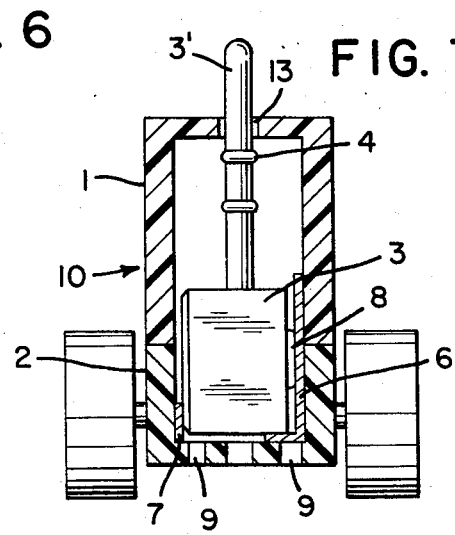
FIG. 7 is a cross sectional view taken along lines 6—6 of FIG. 3 showing the battery lowered to an energizing position for providing an electrical current to the battery of the apparatus.

For the operation of the invention and for the powering of the electric motor 5, it is only necessary to push down on the elongated arm 3' of the casing 3 until the upper projection 4 which, during recharging remained outside of the upper shell 1, enters into the shell thereby bringing both the plate contacts 6 and 7 into electrical contact with the ends of the battery 8. Thereby, a direct supply of current from the poles of the battery is established through the electrical contact plates 6 and 7 and consequently to the electrical motor 5, such operating position being illustrated in FIG. 7 of the drawings.

Therefore, the battery 8, on being properly introduced into the casing 3 may operate by means of the reciprocating up and down motion which has been described. The battery therefore acts as a switch which acts in one position to permit the battery to be charged while being disconnected from the motor and when in a second position provides power to the motor. More than one electrical motor may be energized from one movable battery and/or more than one battery may be used in the same system depending on the constructional requirements. It is obvious that the mechanism which has been described hereinabove may be used in combination with a great variety of applications. In connection herewith, it should be noted that the present invention has been described by making reference to only one example or application and that the invention is not restricted to the one example.

I claim:

1. A toy vehicle apparatus having an electric power source which is rechargeable by a recharger having an upwardly projecting recharging probe comprising a housing having upper and lower portions and first and second ends, first and second axle means disposed through said housing and spaced toward said first and second ends respectively, motor means drivingly connected to one of said first or second axle means, said motor means having opposite electrical poles, a rechargeable battery, casing means slideably disposed within said housing and having an arm portion, a first opening in said housing, said arm portion of said casing means extending outwardly of said first opening in said housing, said rechargeable battery being movably carried by said casing means so as to be linearly movable between first and second positions within said housing, a second opening in said housing, said second opening being generally located opposite to said first opening, a first electrical contact means disposed between one of said poles of said motor and said first position of said battery, second electrical contact means extending between the other of said poles of said motor and communicating with both said first and said second positions of said battery, said motor means being electrically connected to said rechargeable battery when said rechargeable battery is in said first position and said rechargeable battery being moved out of electrical contact with said motor means when said rechargeable battery is in said second position.

2. The toy vehicle apparatus of claim 1 in which said arm portion of said casing means extends outwardly a first distance when said rechargeable battery is in said first position and extends outwardly a second greater distance when said rechargeable battery is in said second position within said housing.

3. The toy vehicle apparatus of claim 2 in which said casing means is urged from said first position to said second position within said housing when the projecting recharging probe of the recharger is inserted through said second opening in said housing.

4. The toy vehicle apparatus of claim 3 in which said first and second electrical contact means are generally fixed with respect to said housing.

5. The toy vehicle apapratus of claim 4 including friction means for retaining said casing means in said second position within said housing.

* * * * *